Oct. 2, 1956

R. A. YOUNG 2,764,844

METHOD OF GRAFTING CAMELLIAS AND OTHER TENDER PLANTS

Filed Jan. 26, 1953

INVENTOR.
RAY ALLEN YOUNG.
BY
Attorney.

United States Patent Office 2,764,844
Patented Oct. 2, 1956

2,764,844

METHOD OF GRAFTING CAMELLIAS AND OTHER TENDER PLANTS

Ray Allen Young, Los Angeles, Calif.

Application January 26, 1953, Serial No. 333,149

1 Claim. (Cl. 47—6)

This invention relates to methods of grafting camellias and other tender plants, and has a its principal object to provide a simple, successful and economical means and method for grafting camellias on to a live branch.

It is known that in order to successfully graft camellias on to another branch, after the cut and connection has been made, the graft must be enclosed in a covering to protect it from bright light and too much air, and at the same time a certain amount of moisture must be provided.

Among the salient objects of my invention are:

To provide a bag, or cup-like member having therein a chamber which can be placed over the graft after the cut and connection has been completed, and which can be tied or closed around the branch on which the graft is made so as to keep the air out, as well as bright light, and also to provide therein an open container with water therein to furnish the needed moisture to the camellia or other delicate plant grafted;

To provide a cup or bag of light material, either opaque or transparent, and which can be placed down over the graft, or up into which said graft can be inserted, with means for closing the open end thereof around the branch, and with an open container with water therein, to furnish the needed moisture. If said bag or cup is of opaque material, it is provided with a window to admit reflected light and which is turned to the north side of the graft for this purpose;

To provide in connection with a graft, a cage-like structure which can be placed over a graft, with the lower ends thereof tied to the branch on which the graft is made, and over which cage-like structure a transparent bag or covering is placed, and over which transparent bag is placed an opaque bag having a window therein which can be placed to the north as it is placed over the transparent bag;

To provide in connection with a graft of the character referred to, a suitable covering to shut out the air and bright light, a small container for water with means for suspending it therein.

In order to explain my invention more in detail, I have shown two embodiments thereof on the accompanying sheet of drawings, which I will now describe:

Figure 1:
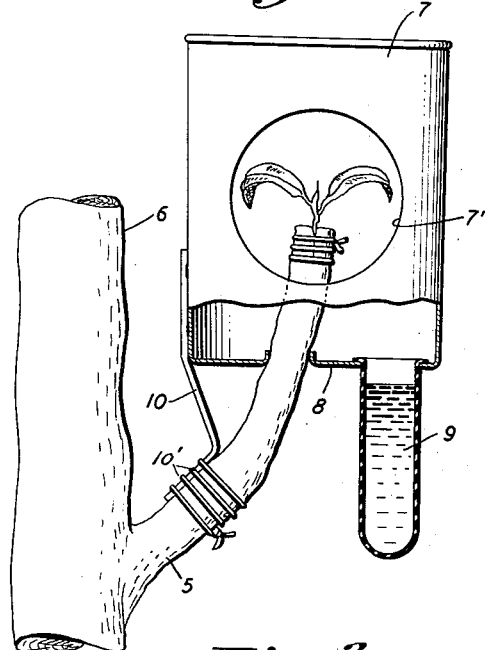
Figure 1 shows a cup-like covering of opaque material and up into which a graft is extended, with a window, and with an open container for water connected through the bottom of said covering, and with means for supporting said covering on the branch on which the graft is made.

Referring now in detail to the drawings, Fig. 1, a branch 5 is shown extending upwardly from a trunk 6, with a graft made in the upper end of said branch, as indicated. This is made by cutting the end of the branch and inserting the camellia stem into said cut and tieing it in the manner indicated, which is the usual method.

In this figure I have shown an inverted cup-like member 7, having a closure 8, up through which said branch 5 is extended in the manner indicated, with any kind of wrapping or sealing means around the branch at the closure to shut out too much air. Also in connection with said closure 8, I have shown an open container or tube 9, connected through said closure 8, in the manner indicated to supply moisture to the chamber in which the graft is protected. A supporting wire, as 10, is connected at one end to the branch, as at 10', with its other end secured to the side of said cup for supporting it in the manner indicated. Any means for supporting said covering for the graft can be used, depending on the nature of the covering article.

Figure 2:
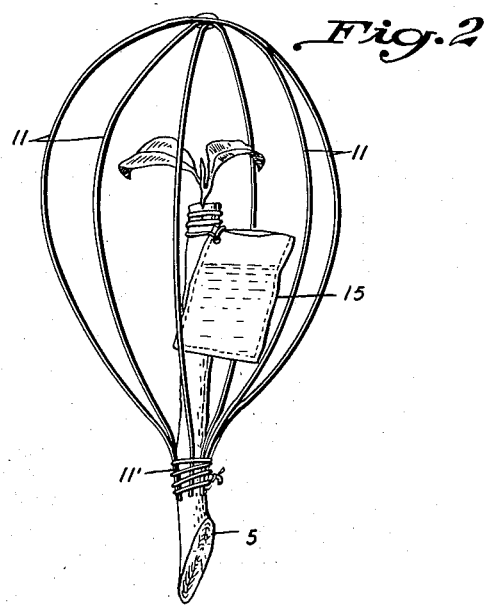
Figure 2 shows a wire cage-like member having the lower ends of its wires tied together around the branch, with an open water container tied to and supported on the graft to supply moisture.
Figure 3:
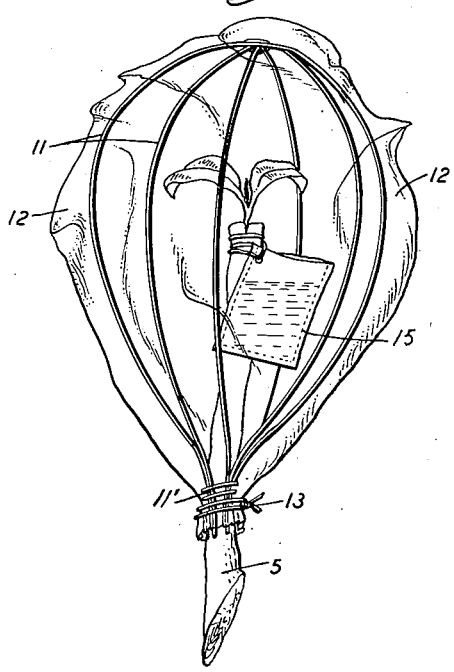
Figure 3 shows the same cage-like member with a transparent bag placed over it and tied around its lower end around the branch.
Figure 4:
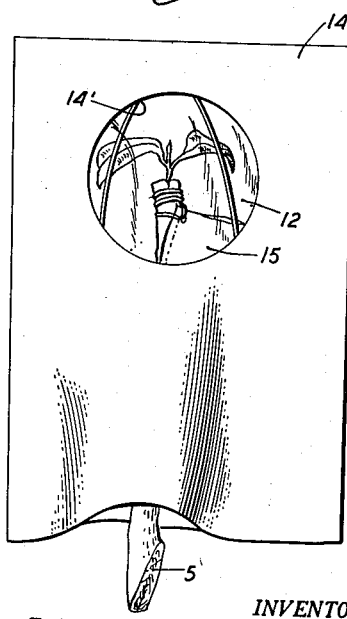
Figure 4 shows the same thing with an opaque bag, having a window therein, placed over said transparent bag to shut out the bright light.

Referring now to Figs. 2, 3 and 4, I have shown another means for providing a cheap and practical covering for such grafts. It includes a cage-like member, made of wire sections secured together at their middles and bent or bowed outwardly in the manner indicated with their lower ends tied around the branch on which the graft is made. These wires are designated 11, 11, and their lower tied ends are designated 11'. Over this cage-like member a transparent bag 12 is shown, which is also tied around its lower end around said branch, as at 13, Fig. 3.

In order to shut out the bright light, where a transparent bag is used, I have provided an opaque bag 14 which is placed over said transparent bag, in the manner shown, said opaque bag having a window 14' therein, which is placed to the north side of the graft and so as to admit reflected light into said chamber where the graft is.

As a means for providing moisture in said chamber, I have shown a small bag of water, tied to the graft in the manner indicated, said water bag being designated 15. This could be any kind of suitable container, as an open bottle with water therein, suspended within the chamber in which the graft is covered and protected.

Thus I have provided a very simple, practical and economical means and method of successfully grafting camellias on to a live branch, and by which many grafts can be made on one tree or bush.

The broad idea is the provision of means providing a chamber which can be placed over the graft and closed around the branch on which the graft is made, with means for admitting reflected light, as from the north, into said chamber, and with means for suspending an open water container in said chamber.

I do not limit the invention to the details shown and described for explanatory purposes, except as I may be limited by the hereto appended claim forming a part of this application.

I claim:

In a method of protecting a graft of a tender cion onto a live branch, the steps of suspending from said branch a water container with water therein, placing over said graft a wire cage-like member so that its wires will extend down around said branch, placing a transparent bag over the branch, the cage-like member and the water container, tying said bag and cage-like member around the branch to shut out cold air, and then placing over said transparent bag an opaque bag having a window opening in one side to admit reflected light.

(References on following page)

References Cited in the file of this patent

UNITED STATES PATENTS

| | | |
|---|---|---|
| 2,446,509 | Fischer | Aug. 3, 1948 |

FOREIGN PATENTS

| | | |
|---|---|---|
| 934,208 | France | Jan. 7, 1948 |
| 218,519 | Germany | Jan. 31, 1920 |

OTHER REFERENCES

Thouin: "Monographie des Greffes," pub. before Oct. 11, 1884, by Roret, at Paris, France. Plate 1, Fig 28–bis, pp. 44 and 41.

Curtis et al.: "The Temperature of Grafts . . .," reprinted (with change of page numbers to 1–4) before Nov. 18, 1940, from Proc. 27th Ann. Meeting of Northern Nut Growers' Assoc., Geneva, N. Y., September 1936, pp 41–44.

"Camellias Illustrated" (Sharp), pub. by Western Trail Publishers (Portland, Ore.) 1949, p. 73.

"Camellias" (Hume), pub. 1951 by MacMillan Co., N. Y., pp. 166–171.